(12) United States Patent
Robinson et al.

(10) Patent No.: US 11,719,095 B1
(45) Date of Patent: *Aug. 8, 2023

(54) MULTI-WELL SYSTEM FOR ENVIRONMENTAL REMEDIATION OR SAMPLING

(71) Applicants: Lance I. Robinson, Parrish, FL (US); Erik R. Piatt, Decatur, TX (US)

(72) Inventors: Lance I. Robinson, Parrish, FL (US); Erik R. Piatt, Decatur, TX (US)

(73) Assignee: En RX Chemical, Inc., Argyle, TX (US)

( * ) Notice: Subject to any disclaimer, the term of this patent is extended or adjusted under 35 U.S.C. 154(b) by 266 days.

This patent is subject to a terminal disclaimer.

(21) Appl. No.: 16/820,214

(22) Filed: Mar. 16, 2020

Related U.S. Application Data

(63) Continuation of application No. 15/670,603, filed on Aug. 7, 2017, now Pat. No. 10,590,765, which is a continuation-in-part of application No. 15/066,811, filed on Mar. 10, 2016, now Pat. No. 10,232,416.

(60) Provisional application No. 62/130,988, filed on Mar. 10, 2015.

(51) Int. Cl.
*E21B 49/08* (2006.01)
*B09C 1/00* (2006.01)
*E21B 43/30* (2006.01)

(52) U.S. Cl.
CPC .............. *E21B 49/08* (2013.01); *B09C 1/00* (2013.01); *E21B 43/305* (2013.01)

(58) Field of Classification Search
CPC ............ E21B 49/08; B09C 1/00; E21B 43/305
See application file for complete search history.

(56) References Cited

U.S. PATENT DOCUMENTS

| | | | | |
|---|---|---|---|---|
| 4,026,355 A | * | 5/1977 | Johnson et al. | ........ B09B 1/006 166/246 |
| 4,163,619 A | | 8/1979 | Fales | |
| 4,582,611 A | | 4/1986 | Wang | |
| 5,074,360 A | * | 12/1991 | Guinn | ................ E21B 43/261 166/281 |

(Continued)

FOREIGN PATENT DOCUMENTS

CN 103920703 A 7/2014

OTHER PUBLICATIONS

Al-Awadhi, et al., Comparison of the potential of coastal materials loaded with bacteria for bioremediating oily sea water in batch culture. Microbiol Res. 2002;157(4):331-6.

(Continued)

*Primary Examiner* — Tara Mayo
(74) *Attorney, Agent, or Firm* — Nicholas Pfeifer; Smith & Hopen, P. A.

(57) ABSTRACT

A device and method for collecting sample fluids from an underground source which includes sample wells terminating in a corrugated conduit and sieve. The sampling regions for each sample well is separated by a grout or expanding seal barrier. Negative pressure is optionally applied to extract fluids from the underground matrix for sampling. The device can also be used for remediating an environmental contaminant from soil or aquifers. Upon identification of at least one environmental contaminant, a remediation composition is injected into the soil or aquifer using the sampling wells of the device. The remediation fluids can be directed to specific locations by selectively utilizing one or more sampling wells to inject the remediation fluid.

20 Claims, 8 Drawing Sheets

(56) References Cited

U.S. PATENT DOCUMENTS

| | | | |
|---|---|---|---|
| 5,279,740 A * | 1/1994 | Basile et al. | B09C 1/005 |
| | | | 210/610 |
| 6,027,284 A | 2/2000 | Prasher et al. | |
| 6,073,659 A | 6/2000 | Lange | |
| 6,312,190 B1 | 11/2001 | Goughnour | |
| 6,364,572 B1 | 4/2002 | Hudgins et al. | |
| 6,749,368 B2 | 6/2004 | Ankeny et al. | |
| 6,846,130 B2 | 1/2005 | Goughnour | |
| 6,978,688 B2 | 12/2005 | Engebretson et al. | |
| 7,004,249 B2 | 2/2006 | Lohbeck | |
| 7,615,156 B2 | 11/2009 | Lenger et al. | |
| 8,210,773 B2 | 7/2012 | Swearingen et al. | |
| 2003/0069142 A1 | 4/2003 | Beal | |
| 2009/0260824 A1* | 10/2009 | Burns et al. | E21B 19/08 |
| | | | 166/302 |
| 2010/0206586 A1* | 8/2010 | Decker et al. | E21B 19/00 |
| | | | 166/385 |

OTHER PUBLICATIONS

Construction Dewatering. Environmental Remediation, Ground-Water Treatment & Technology, LLC (GWTT). http://www.gwttllc.com/103-services/construction-dewatering. Accessed on Jan. 15, 2016.

Koerner, Robert M. et al. Leachate Clogging Assessment of Geotextile and Soil Landfill Filters. US Environmental Protection Agency, 1995.

Mahmoud, et al., A microbiological study of the self-cleaning potential of oily Arabian gulf coasts. Environ Sci Pollut Res Int. Feb. 2010;17(2):383-91.

Sorkhoh, et al., Self-cleaning of the Gulf. Nature. Sep. 10, 1992; 359(6391):109.

* cited by examiner

MULTI-WELL SYSTEM FOR ENVIRONMENTAL REMEDIATION OR SAMPLING

CROSS-REFERENCE TO RELATED APPLICATIONS

This application is a continuation of currently pending U.S. Pat. Application No. 15/670,603 filed on Aug. 7, 2017, entitled, Well Sampling System Incorporating Corrugated and Slotted Injection System and Method of Use which is a continuation-in-part of U.S. Pat. Application No. 15/066,811, now U.S. Pat. No. 10,232,416 entitled, "Corrugated and Slotted Injection System and Method of Use", filed on Mar. 10, 2016, which claims priority to U.S. Provisional Pat. Application No. 62/130,988 entitled, "Corrugated and Slotted Injection System and Method of Use", filed Mar. 10, 2015, the contents of which are herein incorporated by reference.

FIELD OF INVENTION

This invention relates to remediation injection systems for in situ remediation of contaminated soil and/or ground water. More specifically, the invention provides a novel system having a slotted corrugated device for removing liquids and/or injecting chemicals and/or biological material into soil or water using for remediation of contaminated soil and/or ground water.

BACKGROUND OF THE INVENTION

Environmental testing has become increasingly important, especially in locations where manufacturing and other commercial activities were once performed. The storage of liquids and gases, particularly hazardous waste, the disposal of waste material and monitoring thereof were woefully inadequate for a large time. Seeping of environmental contaminants has the potential to cause considerable harm to humans, both at the site of the contaminant, as well as distant sites, due to movement of water and other materials in the soil. Thus, numerous sites are now either required to undergo environmental testing or the owners wish to have environmental testing performed.

However, many commercial sites have structures, such as buildings, that limit access to the soil and groundwater. Conventional testing requires excavation of the structure, such as drilling through the floor, which increases cost for testing, and can undermine the structure.

Further, hazardous waste site cleanup is a major environmental concern, with contaminants at many sites posing an immediate environmental concern. Typically, these hazardous waste sites were created by the dumping of hazardous chemicals in inadequately designed dump pits or sites, such as bulk disposal or disposal in leaking or non-corrosion resistant containers. The chemicals at these sites accordingly seep into the underlying soils and into underlying aquifers. The movement of the contaminants within the soil and aquifers has resulted in large the contaminated areas, well beyond the actual dump site.

One method of decontaminating the hazardous waste sites was to completely remove the contaminated soil by excavation, followed by treatment of the removed soil at a processing facility or transport of the soil to another landfill site from which the spread of contaminants was more easily controlled. However, this method is very expensive and time consuming. Moreover, transporting the contaminated soil from one site to another only postpones the eventual treatment.

Another method for mitigating ground water contamination has been fluid removal. In fluid removal systems both drains and wells have been used. Typically, the use of drains involved excavating a pit located toward the downstream end of the contaminant plume. Prior conduit systems have been used for injection or removal of fluids. For example, Wang (U.S. Pat. 4,582,611) describes a corrugated drain having a porous filter. Variations use openings in the piping to provide openings for fluid transfer through the piping, as seen in Goughnour (U.S. Pat. 6,846,130) and Fales (U.S. Pat. 4,163,619). Beal (U.S. Appl. 09/974,726) discloses a device comprising a tube containing baffles, which injects an oxidant to remediate a water-born contaminant as it flows through the device. Similarly, Swearingen, et al. (U.S. Pat. 8,210,773) uses piping systems to inject oxidant with the goal of removing pollutants from soil.

However, these drain systems have limited application to shallow plumes and in low permeability soils. Since drains are generally exposed to the surface, this remediation method is not desirable in flood-prone areas. Moreover, removal of contaminants with drain systems is often slow, commonly requiring many years to reduce the contaminants to an environmentally acceptable concentration.

Other systems for remediating contamination include conversion of landfills into bioreactors. For example, Hudgins, et al. (U.S. Pat. 6,364,572) provides aeration pipes that inject oxygen or ambient air into the landfill and leachate collection pipes that remove liquid forming in the landfill to provide an improved growth environment for microbes in the landfill, allowing for biodegradation of contaminants. Similarly, Ankeny, et al. (U.S. Pat. 6,749,368) provides aeration pipes installed above a landfill, for injection of air into the soil and monitoring and extraction of contaminants.

While most of the industry uses vertical drilling, there are a few applications where horizontal drilling is used to provide long continuous wells (several hundred to thousands of feet long) for environmental work. However, these wells are used for a single operation, i.e. a simple conduit for direct pumping of fluid into the soil or removal of fluid from the soil. The main drawback is the singularity of traditional wells.

What is needed is a means to efficiently test for environmental contaminants and optionally direct remediation materials to specific zones on subsurface structures to effectuate directed decontamination of a soil or other matrix.

SUMMARY OF THE INVENTION

In contrast to the known methods for sampling for contaminants from hazardous waste sites and other contaminated sites, the instant invention provides a method of soil/matrix sampling at multiple locations in the borehole, making the system less expensive, substantially more reliability, and which produces the desired results in a significantly more timely manner. Furthermore, the sampling system can also be used for decontamination and cleanup of groundwater and environmental matrices, enhancing the efficacy of the system.

The environmental sampling system is formed of a plurality of sample wells having different longitudinal dimensions, that are tacked together using the well having the largest longitudinal dimension, i.e. the longest sample well, hereinafter called the anchor well or anchor line. The sample wells have a tubular, ovular, or rhomboid body with a first end covered in a sampling mesh, and a second end that is dimensioned to seat on a pump, manifold, or vacuum/pressure lines of a pump. The sample well lines are oriented in a first direction, and are optionally ¼", ⅜", ½", ⅝", ¾", ⅞", 1, 1.25 inches in diameter. In some variations, the system includes at least one grout line, having a tubular, ovular, or rhomboid body. The grout lines have a first end which terminates in an open line and a second end that is dimensioned to seat on a pump, manifold, or pressure lines of a pump. The at least one grout line is oriented in a second direction is tacked adjacent to the sampling mesh of the anchor well. In some variations, the grout lines are dimensioned ½ inch or ⅜ inch OD.

The sample wells are optionally formed of high-density polyethylene (HDPE), low-density polyethylene (LDPE), HDPE/LDPE (high-density polyethylene, low-density polyethylene), steel, flexible steel, rubber, polyvinyl chloride (PVC), or other plastic. Some examples of useful plastics include acrylonitrile butadiene styrene (ABS), polylactic acid polyethylene/acrylonitrile butadiene styrene, polycarbonate/acrylonitrile butadiene styrene, polyamides, polyethylene, polypropylene, polyethylene, polyethylene terephthalate, polyvinylchloride, polyvinylidene chloride, polycarbonate, polyurethane, polyamide, polytetrafluoroethylene, polyvinyl acetate, polystyrene, high impact polystyrene (HIPS), acrylic (PMMA), cellulose acetate, cyclic olefin copolymer (COC), ethylene-vinyl acetate (EVA), ethylene vinyl alcohol (EVOH), polyvinyl fluoride (PVF), polyvinylidene fluoride (PVDF), polytetrafluoroethylene (PTFE), polychlorotrifluoroethylene (PCTFE), fluorinated ethylene-propylene (FEP), perfluoro alkoxy polymer (PFA), polyethylene chlorotrifluoroethylene (ECTFE), polyethylene tetrafluoroethylene (ETFE), perfluoropolyether (PCPE), acrylic/PVC polymer, aromatic polyester polymers (liquid crystal polymer), polyoxymethylene (acetal), polyamide (PA, nylon), polyamide-imide (PAI), polyaryletherketone (PAEK), polybutadiene (PBD), polybutylene (PB), polybutylene terephthalate (PBT), polycaprolactone (PCL), polychlorotrifluoroethylene (PCTFE), polyethylene terephthalate (PET), polycyclohexylene diethylene terephthalate (PCT), polycarbonate (PC), polyhydroxyalkanoate (PHA), polyketone (PK), polyester, polyethylene (PE), polyetheretherketone (PEEK), polyetherimide (PEI), polyether sulfone (PES), chlorinated polyethylene (CPE), polyimide (PI), polylactic acid (PLA), polymethyl pentene (PMP), polyphenylene oxide (PPO), polyphenylene sulfide (PPS), polyphthalamide (PPA), polypropylene (PP), polystyrene (PS), polysulfone (PSU), polytrimethylene terephthalate (PTT), polyurethane (PU), polyvinyl acetate (PVA), polyvinyl chloride (PVC), polyvinylidene chloride (PVDC), styrene-acrylonitrile (SAN), phenolics, such as Bakelite, and KYNAR (a polyvinylidene fluoride (PVDF) resin). Nonlimiting examples of rubber that are useful in the present invention includes latex (natural) rubber, isoprene rubber, ethylene propylene diene rubber, nitrile rubber (copolymer of butadiene and acrylonitrile), isobutylene isoprene butyl rubber, bromo isobutylene isoprene rubber, chloro-isobutylene isoprene rubber, styrene butadiene rubber, silicone rubber, isobutylene isoprene rubber, polyisobutylene rubber, polybutadiene rubber, polychloroprene rubber, acrylonitrile butadiene rubber, ethylene-acrylate rubber, polyester urethane rubber, polyether urethane rubber, polyacrylate rubber, chlorosulphonated polyethylene rubber, ethylene propylene rubber, ethylene propylene diene monomer rubber, perfluorocarbon rubber, epichlorohydrin rubber, fluoro silicone rubber, fluorocarbon rubber, hydrogenated nitrile butadiene rubber, styrene butadiene block copolymer rubber, thermoplastic polyether-ester rubber, acrylonitrile butadiene carboxy monomer rubber, vinyl methyl silicone rubber, polysiloxane rubber, styrene ethylene rubber, and butylene styrene copolymer rubber.

The sampling mesh optionally comprises a sieve having an upper end and a lower end and an interior lumen. The sieve is made of flexible or semi-flexible material, such as geotextile sock, wire mesh, or stainless-steel screen. Exemplary geotextile socks include geotextile polyester, polyethylene, polypropylene, high density polyethylene, fiberglass, and combinations thereof. A corrugated conduit is provided in the interior lumen of the sieve. The corrugation ridges of the conduit run perpendicular to the longitudinal axis of the corrugated conduit. The corrugated conduit also has at least one sampling channel running parallel to the longitudinal axis of the corrugated conduit and formed from partial removal of the ridges of the corrugated conduit. For example, partial removal of corrugated conduit wall, of from ¼ to ½ the overall thickness of the corrugated conduit wall, along a straight line forms a channel. Optionally, the partial removal is at a thickness of ¼ ⅓, ⅜, ½ the overall thickness of the corrugated conduit wall. The channel is continuous along the length of the corrugated conduit. The corrugated conduit is plastic, such as those discussed above, steel, or rubber, such as those disclosed above. The first end of the sieve is tacked to the body of the sample well.

In some variations, the sampling well is capped on the first end. A cap is used the preventing free flow of materials through the first end of the well, particularly when the sampling well is used to inject air or other remediation materials into the environmental matrix. The cap is formed of plastic, metal, rubber, or silicon. Nonlimiting examples of useful plastics and rubbers are disclosed above. Where a cap is used on the sample well, sampling holes are disposed along the length of the well that is encased in the sampling mesh. The holes are optionally about 3/32 inches in diameter. For example, the sample well line holes can be 1/16 (2/32), 5/64, 3/32, 7/64, or ⅛ (4/32) inches in diameter. In some variations, the injection holes are disposed at between 1 hole per foot and 5 holes per foot. For example, the holes may be disposed at 1 hole per foot, 1.25 holes per foot (1 hole every 0.8 feet), 1.5 holes per foot (1 hole every 0.67 feet), 1.75 holes per foot (1 hole every 0.57 feet), 2 holes per foot (1 hole every 0.5 feet), 2.25 holes per foot (1 hole every 0.44 feet), 2.5 holes per foot (1 hole every 0.4 feet), 2.75 holes per foot (1 hole every 0.36 feet), 3 holes per foot (1 hole every 0.33 feet), 3.25 holes per foot (1 hole every 0.31 feet), 3.5 holes per foot (1 hole every 0.29 feet), 3.75 holes per foot (1 hole every 0.27 feet), 4 holes per foot (1 hole every 0.25 feet), 4.25 holes per foot (1 hole every 0.24 feet), 4.5 holes per foot (1 hole every 0.22 feet), 4.75 holes per foot (1 hole every 0.21 feet), or 5 holes per foot (1 hole every 0.2 feet).

The environmental sampling system optionally includes an installation sleeve, formed of a tubular, ovular, or rhomboid body whose cross-section is dimensioned to accept the plurality of sample wells and the optional at least one grout line. The body of the installation sleeve possesses a first end and a second end, where the second end is adapted to mate to a drill. Optionally, the size of the installation sleeve is determined by the following formula $$\left(\left[\left[\left([n-1]\times r_s^2\right)\times \pi\right]+\left[r_m\times \pi\right]\right]\Big/\left[r_i^2\times \pi\right]\right)\times S_t$$

where n is the number of sampling well lines;
$r_s$ is the radius of the sampling well line;

$r_m$ is the radius of the sampling mesh for the anchor line;
$r_i$ is the radius of the installation sleeve;
$S_t$ is sleeve threshold, set to between 53% and 55%.

The sampling wells are optionally in fluid communication with the second end of the sample well body, where the sampling system or sampling pump is a negative displacement pump, a diaphragm pumps, peristaltic pump, a screw pump, a metering pump, a piston, a pump, a centrifugal pump, a jet pump, or an electric diaphragm pump. Non-limiting examples include Delavan 2200 or FB2 pumps or Geoprobe GS 2000 or DP 800. Optionally, the grout lines are in fluid communication with positive displacement pumps, such as chambered diaphragm pumps, like Delavan 2200 or FB2 pumps.

The sample wells and optionally grout lines can be tacked together using a strap or tie wrap disposed on the first end of the sieve. Optional strap or tie wraps include steel, plastic, pull lines, pull ties, mill tape, liquid adhesives, screws, binding straps, rope/twine, or metal bands. Exemplary materials include steel, metal, or plastic, such as the plastics discussed previously.

A method of sampling for an environmental contaminant in a matrix is also provided herein using the environmental sampling system disclosed above. The environmental sampling system was inserted into an installation sleeve and inserted into the environmental matrix. After inserting the sampling wells, injecting grout or expanding sealant was injected through the at least one grout line into the matrix; and the environmental matrix tested for environmental contaminant. Nonlimiting examples of grout or expanding sealant are Portland cement, bentonite, expanding polyurethane foam, expanding foam (polyurethane)/environmental foams, environmentally safe foams, or a combination thereof. Optionally, the testing for the environmental contaminant was comprised of subjecting the plurality of sampling wells to a first negative pressure, collecting effluent from each of the plurality of sampling wells; and analyzing the effluent to identify one or more environmental contaminants. Testing can optionally be performed using EPA Methods 8260b for Volatile Organic Compounds, and 8270c sim for semi volatile compounds, EPA 8081b for Organochlorine pesticides or similar methods. Nonlimiting examples of a first negative pressure include 2 inHg (inches of mercury) to 10 inHg, depending on depth and environmental matrix composition. In some variations, the vacuum results in 10 cfm to 40 cfm of fluid movement. Nonlimiting examples include 2 inHg, 3 inHg, 4 inHg, 5 inHg, 6 inHg, 7 inHg, and 8 inHg. Particularly useful examples include 2 inHg, 2.5 inHg, 3 inHg, 3.5 inHg, 4 inHg, 4.5 inHg, 5 inHg, 5.5 inHg, and 6 inHg.

To insert the environmental sampling system into the environmental matrix, the sample well bundle was inserted into the installation sleeve. A horizontal bore hole was drilled into the environmental matrix. The drilling optionally includes advancing a horizontal direction drill into the environmental matrix at an angle to a preselected depth, followed by leveling the drilling to a horizontal position in relation to the matrix surface and advancing the drill for a preselected distance. The drill was then angled to a preselected angle and advanced into the environmental matrix until the horizontal direction drill reaches the matrix surface. The installation sleeve was then optionally fixed to the drill. A liquid insertion medium was then added into the bore hole. The installation sleeve and sample well bundle were then inserted into the bore hole. The installation sleeve was removed from the bore hole, while concomitantly retaining the sample well bundle in the bore hole. The insertion medium and water was removed from the environmental matrix.

The injection portion of the inventive system has at least one continuous sample well channel and sampling/injection points along the length of the sampling portion of the sampling well. The sampling portion of the sampling well is defined as the portion of the sampling well covered by the sampling mesh. The sampling/injection portion of the system disclosed herein can be used independently or in a group, such as a bundle of systems disposed in adjacent wells. For example, a series of 6 wells use six injection systems, allowing for control of 6 independent well screen (socked conduit) sections adding control to a formerly uncontrolled environmental situation. Advantageously, as the wells are sealed, each well is separate and isolated, permitting independent testing and/or injection of air and/or other remediators to specific areas of the environmental matrix. This appears to be required for use with air injection (which requires higher pressures). The seals are generally Portland cement with bentonite to expand or use of expanding foam (polyurethane)/environmental foams. Alternatively, one or more bore holes are provided, with each bore hole containing a plurality of injection systems. For example, and without limiting the scope of the invention, each bore can include 3 injection systems, 4 injection systems, 5 injection systems, 6 injection systems, 7 injection systems, 8 injection systems, 9 injection systems, 10 injection systems, or 11 injection systems.

The environmental sampling system is optionally also used to remediate the environmental contaminant in the matrix by injecting at least one remediator, extracting the environmental contaminant, or a combination thereof. Where the environmental sampling system was used to inject at least one remediator into the environmental matrix, a remediator was added into a liquid carrier to form a remediation fluid and the remediation fluid injected into at least one sampling well, where the sample well indicated presence of the environmental contaminant. The environmental contaminant was contacted with the remediation fluid and allowed time to degrade or dispose of the environmental contaminant. Alternatively, where the environmental sampling system was used to extract the environmental contaminant from the matrix, the sampling well is exposed a second negative pressure. The second negative pressure is greater than the first. For example, the sampling wells may optionally be connected to a vacuum pump designed to remove liquid materials and the environmental contaminant extracted by the vacuum pump. The second negative pressure is dependent upon depth, the environmental contaminant for extraction, and the matrix. For sampling wells up to 15 ft deep the second negative pressure is 10 inHg to 15 inHg. Nonlimiting examples include 10 inHg, 11 inHg, 12 inHg, 13 inHg 14 inHg, 15 inHg. For wells beyond 15 ft, peristatic pumps, double valve pump and Solinst pumps, are used to provide larger negative pressure. Nonlimiting examples include 15 inHg, 16 inHg, 17 inHg, 18 inHg, 19 inHg, 20 inHg, 21 inHg, 22 inHg, 23 inHg, 24 inHg, and 25 inHg. A nonlimiting example of a pump is Solinst Model 408M Micro Double Valve Pump. In some variations, an environmentally friendly solvent was added to the environmental matrix prior to exposing the sampling well to a second negative pressure. The environmentally friendly solvent dissolves the environmental contaminant, and the environmentally friendly solvent extracted using the second negative pressure.

Where a remediator is injected into the soil or matrix, the remediator is optionally a chemical oxidant (ChemOx) or a biological remediator. Useful chemical oxidants are oxidizing agents, such as a permanganate, peroxide, or persulfate. Specific examples include potassium permanganate and sodium permanganate. Biological remediators include microbes, such as *Deniococcus radiodurans, Burkholderia xenovorans, Rhodococcus* sp. strain RHA1, *Aromatoleum aromaticum* strain EbN1 *Geobacter metallireducens, Dehalococcoides ethenogenes* strain 195, *Dehalococcoides* sp. strain CBDB1, *Desulfitobacterium hafniense* strain Y51, *Acinetobacter calcoaceticus, Micrococcus* sp. (Al-Awadhi, et al., Comparison of the potential of coastal materials loaded with bacteria for bioremediating oil sea water in batch culture. Microbiol Res. 2002;157(4):331-6) and naturally occurring species, such as blue-green bacteria found in the Arabian Gulf (Sorkoh, et al., Self-cleaning of the Gulf. Nature. 1992 Sep 10;359(6391):109; Mahmoud, et al., A microbiological study of the self-cleaning potential of oily Arabian gulf coasts. Environ Sci Pollut Res Int. 2010 Feb;17(2):383-91). In some variations, the bacteria can be genetically engineered microorganisms containing genes to allow or improve degradation of contaminants. The remediator is optionally suspended in a water carrier.

BRIEF DESCRIPTION OF THE DRAWINGS

For a fuller understanding of the invention, reference should be made to the following detailed description, taken in connection with the accompanying drawings.

DETAILED DESCRIPTION OF THE PREFERRED EMBODIMENT

Figure 1:
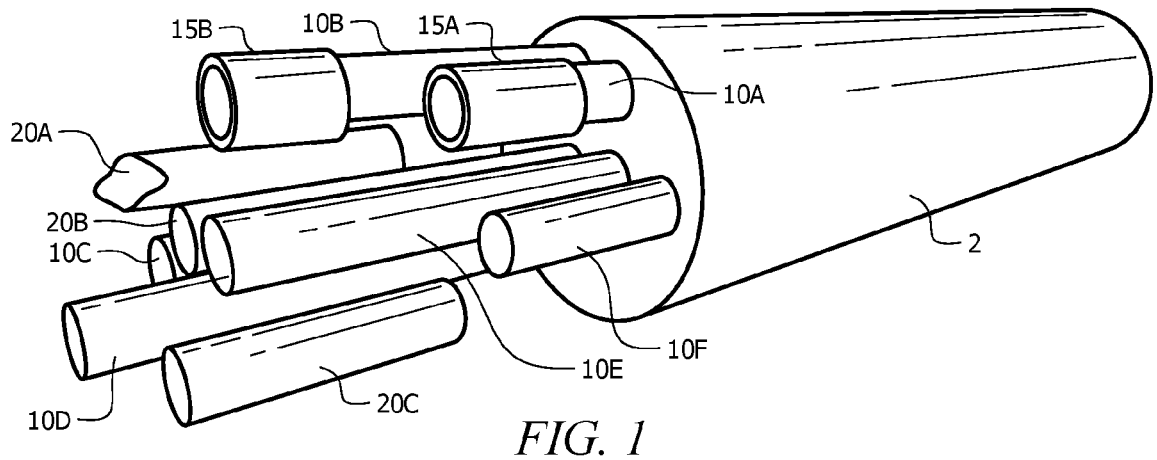
FIG. 1 is an isometric view of the sampling system, showing the sample well bundle within the installation sleeve.

The disclosed device is a sampling system used in environmental well applications. Advantageously, the system can be used for both extraction of fluid and injection of fluids. For example, sampling systems have applications in extraction and testing of groundwater or vapor that may be contaminated. In some instances, the sampling system can also be used for remediation, such as extraction of the contaminant, or injection of chemicals, elements or remedial materials that aide in environmental restoration.

As used herein, the singular forms "a," "an" and "the" include plural referents unless the context clearly dictates otherwise. Thus, for example, reference to "a biological material" includes a mixture of two or more materials and the like.

As used herein, "about" means approximately and is understood to refer to a numerical value or range of ±15% of the numerical. Moreover, all numerical ranges herein should be understood to include all integer, whole or fractions, within the range.

As used herein "matrix" means a material containing an environmental contaminant. Examples of substrates include soil, clay, bedrock, and water sources, such as ponds and lakes.

As used herein "tube" or "pipe" refers to any compressible or non-compressible cylindrical structure having a hollow interior lumen and provides a conduits or passageway for fluids.

As used herein "corrugation" or "corrugated" refers to a structure having wavy or ridged surface.

As used herein "chemical remediator" is any compound that reacts with and degrades a contaminant, such as a hydrocarbon. Chemical remediators can include oxidizing chemicals or reducing chemicals.

As used herein "oxidizing chemical" means a chemical that possesses the capacity to undergo a reaction in which electrons are obtained from another material identified as an environmental contaminant.

As used herein "reducing chemical" means a chemical that possesses the capacity to undergo a reaction in which electrons are lost to another material identified as an environmental contaminant.

As used herein "biological remediator" is any microbe having a natural or genetically engineered ability to degrade, metabolize, or otherwise remediate an environmental contaminant a contaminant, such as a hydrocarbon.

As used herein the terms "microorganism" and "microbe" refer to tiny organisms. Most microorganisms and microbes are unicellular, although some multicellular organisms are microscopic, while some unicellular protists and bacteria (e.g., *T. namibiensis*) called are visible to the naked eye. Microorganisms and microbes include, but are not limited to, bacteria, fungi, archaea and protists, microscopic plants, and animals (e.g., plankton, the planarian, the amoeba) and the like.

Contaminant remediation requires identification of a contaminated matrix, i.e. location of the contaminant, and degradation or removal of the contaminant. However, as most remediators are not without side effects, it is preferable to have focused contaminant treatment, directed to the contaminant. However, previous systems indiscriminately undergo treatment— whether through indirect injection of remediator or generalized removal of contaminated fluids — resulting in chemicals or biologicals in uncontaminated soil, and higher-than-required amounts of chemicals or biologicals applied to the environmental matrix. As such, a remediation composition delivery system is provided that allows for directed injection of a chemical or biological agent into the soil and/or groundwater to treat contamination. Advantageously, the system can also be used for detection of subsurface contaminants.

Example 1

Sampling system 1 comprises a plurality of sampling well 10, designated 10A and 10B, with each sampling well terminating in a sampling mesh 15, such as sampling mesh 15A on a first end of sampling well 10A, sampling mesh 15B on a first end of sampling well 10B, and sampling mesh 15C on a first end of sampling well 10C. The sampling mesh covers a first end of the sampling well, designed to collect material from a matrix for sampling, and was formed of a corrugated and slotted sampling system, as described in U.S. Appl. 15/066,811. Briefly, a corrugated conduit with a sampling channel formed from the removal of corrugation ribs was inserted over the sampling end of a sample well tube. The corrugated conduit was capped and covered in a sieve. A grout spacer was disposed between sampling mesh 15A and sampling mesh 15B, preventing bleed over of analytes between the two sampling regions.

In preferred embodiments, sampling system 1 comprises a large number of sampling wells, designated 10A through 10F in FIG. 1. While the disclosure is made with respect to numerous sampling wells with the same diameter, it is contemplated that the inventive system can use sampling wells having differing diameters. Advantageously, the present system can accommodate 11 sampling wells having a 0.5-inch OD with a 1.25-inch sieve, in a 4-inch borehole.

Example 2

Figure 2:
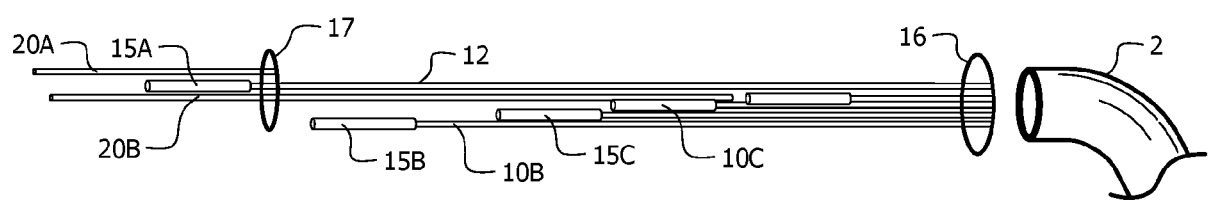
FIG. 2 is a longitudinal side view of the injection system showing sample well bundle with tacking being loaded into the installation sleeve.

Sampling system 1 was prepared by inserting a sampling mesh 15, formed of tubular mesh or corrugated filter as described in Example 1 with a 1.25-inch outer dimeter, on a first end of a high-density polypropylene tubing having a 0.5-inch OD and ⅜-inch ID. The tubes form a channel for sampling wells 10. This process was repeated with tubing of various lengths, such as each tube differing by 10 feet. The plurality of tubes was aligned with the second end of each tube aligned with the other tubes, as seen in FIG. 2. The longest tube was designated the anchor sampling well 12. The remaining tubes were tacked to anchor sampling well 12 at sample well tacking 16, forming a sampling well bundle. Methods of tacking the sampling wells to the anchor sampling well would be evident to one of skill in the art upon review of this disclosure. Non-limiting examples include adhesive tape, a pull line, pull ties, mill tape, liquid adhesives, screws, binding straps, or rope/twine.

At least one grout line 20 was assembled into the sampling well bundle, running opposite the sampling wells, thereby limiting the space required for the sample well bundle. Nonlimiting examples of grout lines are 0.5-inch or ⅜-inch tubing. This orientation minimizes the bore hole size, keeps the drilling process small and efficient, and allows for improved drill control and enhanced bend radius when drilling. This also enables well designs and site locations that would not be available using sample well bundles having the sample wells and grout lines running in the same direction.

First grout line 20A was oriented such that a first end terminates along the tubing for the anchor sampling well 12. Where sample well tubing is provided in 10-foot sections, the grout line terminates about 4 feet beyond sampling mesh 15, i.e. the grout line and sample well overlap by about 4 feet.

Where a third sample well is included in the sample well bundle, a second grout line is assembled into the sampling well bundle. Second grout line 20B is oriented such that a first end terminates along the tubing for second sample well 10B. As described above, second grout line 20B is disposed along the tubing for second sample well 10B, such that second grout line 20B overlaps second sample well 10B. Additional grout lines, such as grout line 10C can be included, based on the formula G=W-1, where G is the number of grout lines and W is the number of wells. In each instance, the grout line will overlap with the tubing of a sample well and terminate between the sample mesh of one sample well and another sample well.

After the grout lines were oriented into the sample well bundle, the grout lines were tacked to anchor sample well 12 at grout line tacking 17. Grout line tacking 17 was disposed along the tubing of anchor well 12 adjacent to sample mesh 12A, as seen in FIG. 2. The grout lines were tacked to the anchor line using materials that would be evident to one of skill in the art upon review of this disclosure. Non-limiting examples include duct tape, screws, binding straps, and pull ties.

The sample well bundle was loaded into installation sleeve 2, which comprises a high-density polypropylene conduit. For smaller sample well bundles, installation sleeve 2 has a 2.95-inch internal diameter and 3.5-inch outer diameter. However, for larger sample well bundles, installation sleeve 2 has an outer diameter of 4.5-inches or 5.56-inches and has a standard dimension ratio (SDR) of about 13.5. The sample well bundle was anchored to a first end of installation sleeve 2. Non-limiting examples of devices that anchor the sample well bundle include a pull line (mill tape or rope/twine) tied to an anchor point on the sleeve or drill pull. A drill pull swivel was mounted to a second end of installation sleeve 2.

In some embodiments, the sample well bundle, loaded into installation sleeve 2, was spooled and placed on the back of a trailer. This increases the speed of installation as it eliminates the need to build and assemble the sample well bundle at the site. Moreover, installation cannot be performed in some sites for various reasons, such as lack of space to assemble the bundle. Therefore, these embodiments enable well designs and site locations that would not be otherwise available for testing. The designs utilized herein are advantageous as no other well screen systems are capable of spooling, as regular well screens break, or are too stiff to spool.

Figure 3:
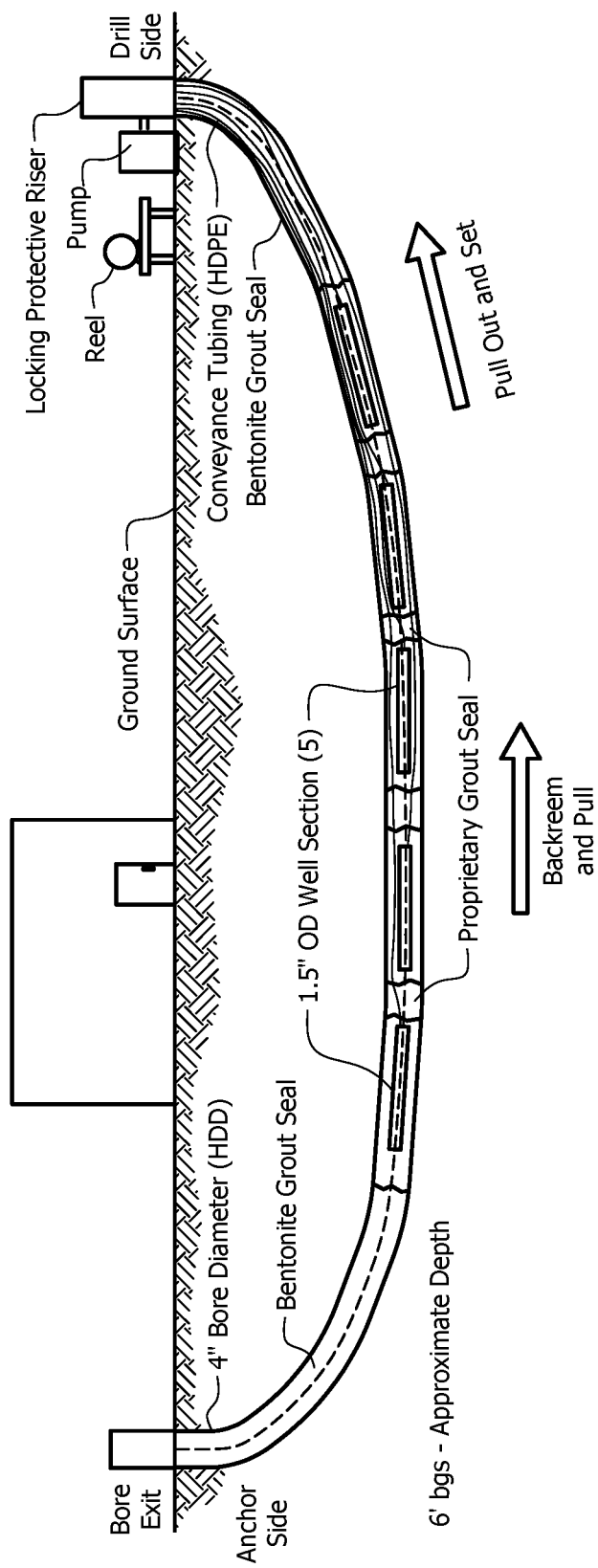
FIG. 3 is a cross section view of the HDD drill set-up, showing the and bore hole.

A 6-inch drill tip (bit) was used for the sampling system installation, though other drill tip sizes have been used, such as 4-inch to 8-inch bits and are encompassed in the disclosure. The HDD drill was placed at an entry point, A, and advanced from the entry point at an applicable angle depending on space and layout considerations. Typical installations use an entry angle of 20% to 30%. As the drill rod was advanced and as it approaches a target depth, B, the angle was removed slowly until the rod and drill tip were at 0%, i.e. horizontal or parallel to the matrix surface. A drilling fluid (bentonite, mud or other environmentally safe fluid) was used to perform steerable mud rotary auger techniques and ensure the bore stays open and cuttings were removed from the bore hole. Drill mud was collected at the surface using a vacuum truck or other vacuum equipment, as is known in the art. The drill was advanced at about 0%, or at 0%, until the borehole length was achieved. The drill was then angled, such as 20%, to advance the drill back to the matrix surface, at exit point C, as seen in FIG. 3.

The drill pull swivel was attached to a horizontal direction drill (HDD) bit. The HDD reaming head was placed at exit point C, and advanced back through the borehole drilling backward, i.e. the hole was back reamed, using a mud to lubricate installation sleeve 2. During the back reaming, installation sleeve 2, containing the sample well bundle, was moved into the borehole. At the surface, the HDD drill was disconnected from installation sleeve 2. Mud break fluid was added to the installation sleeve, such as, Hydrogen Peroxide, Chlorine, ThinzIt ® (Wyo-Ben, Inc., Billings, MO), Aquaclear® PFD (Halliburton Co., Houston, TX). Typical products are formed of a lubricant and acidic solution, bentonite, with or without additives like potassium formate, and mixes of cellulose, clay and/or silica with additives. Optional lubricants include polyalphaolefins, polybutenes, and polyolesters having a viscosity of about 20-400 centistokes, such as polyolesters including neopentyl glycols, trimethylolpropanes, pentaerythritols and dipentaerythritols, and non-toxic petroleum-based lubricants, like white mineral, paraffinic and MVI naphthenic oils having the aforementioned viscosity range. Additives can include bonding agents, such as an acrylic, silicone, urethane, hydrocarbon, epoxy, and/or lacquer resins. The additives can also include non-toxic solid fillers, such as, for example, calcium carbonate, tricalcium phosphate, cerium fluoride, graphite, mica or talc. The composition may further include conventionally used rust, corrosion and/or oxidation inhibitor. Other examples of compositions of mud break fluid are disclosed in Oldiges, et al. (U.S. Pat. No. 5,286,393); Allison (U.S. Pat. No. 4,618,433); Art (U.S. Pat. No. 3,557,876); Harmon (U.S. Pat. No. 4,659,486); and Patel, et al. (U.S. Pat. No. 5,424,284).

The sample well bundle was anchored and installation sleeve 2 attached to a reel and spool trailer or other removal device. installation sleeve 2 was removed from the borehole. The matrix surrounding the sample well bundle was allowed to settle. The well system (well segments) was developed by using suction pumps or a vacuum truck to remove drill mud and allow the formation to equalize around the well materials. Each tube for the sample well was attached to a manifold or directly to the pump, and then activated, thereby removing mud and water from the matrix surrounding the sample well. Well development usually requires at least 3 hours, which varies with matrix lithology. For example, in a fine sand soil, collapse occurs within 30 minutes, as evidenced by the fact that the devices can no longer be shifted, whereas clay soils require 3 hours or more. In some instances, the wells were reoriented within 5 to 10 minutes of insertion into the matrix to ensure the final placement was exact.

Grout or sealant was inserted into grout line 20 and injected into the matrix. The grout can be bentonite, environmentally safe foams, Portland cement, expanding polyurethane foam, or a combination thereof. An example of environmentally safe foam is AlchemyPolymers AP Soil 600 (Alchemy-Spetec, Tucker, GA). The grout was inserted using a positive pump, such as chambered diaphragm pump, or other positive displacement system. Non-limiting examples include Delavan 2200 or FB2 pumps. The grout fills voids in the matrix, and optionally fills about ⅕ of the well space, forming a seal between the sampling regions of the sample wells. As an example, a grout or sealant source was fixed of a second end of first grout line 20A, located on entry point A and the grout or sealant pressurized to force the grout or sealant out of the first end of first grout line 20A, isolating sampling mesh 15A from sampling mesh 15B. Where more than two sample wells were provided, the grout or sealant source was fixed to a second end of second grout line 20B, and the grout or sealant injected into second grout line 20B as before. The process was repeated for any additional grout lines. Optionally, after grouting or sealing the system, the grout lines were cut and Portland cement seal 37 placed on the bore hole head side and bore hole exit side of the hole.

Example 3

Figure 4:
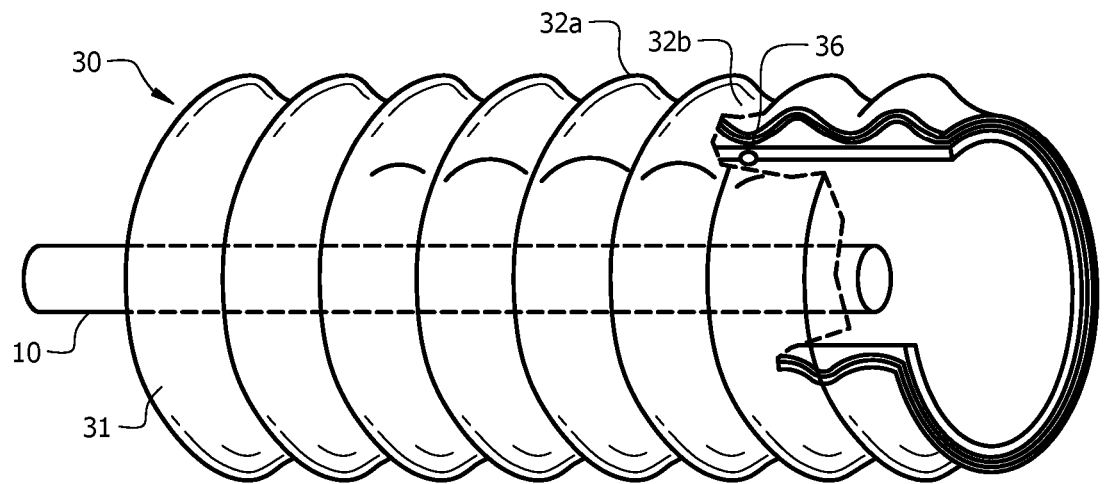
FIG. 4 is an isometric view of the corrugated sampling mesh system.

Sampling mesh 15 was optionally formed of corrugated conduit 30, which comprises a plurality of corrugated ridges formed of trough 34 and peak 35 disposed perpendicular to the longitudinal axis of corrugated conduit 30, as seen in FIG. 4. The corrugated conduit was formed of low-density polyethylene (LDPE) tubing. Sample well tubing ran parallel to the longitudinal axis of corrugated conduit 30 and terminates in the interior of corrugated conduit 30. Sampling channel 36 was formed on outer surface 31 of corrugated conduit 30 from the removal of the corrugated conduit, i.e. external rib 32b, while retaining the remainder of the corrugated conduit, i.e. internal rib 32a. As an example, a circular saw can be used to remove external rib 32b while retaining internal rib 32a and allow the conduit's internal rib to collect liquids in the ground for matrix sampling or leak the fluid uniformly over the body length for remediation. The remaining portions of the external rib after formation of sampling channel 36 provide channels that allow fluid to travel around the body of sampling mesh 15 and into the interior of corrugated conduit 30 for collection by sample well tubing.

Figure 5:
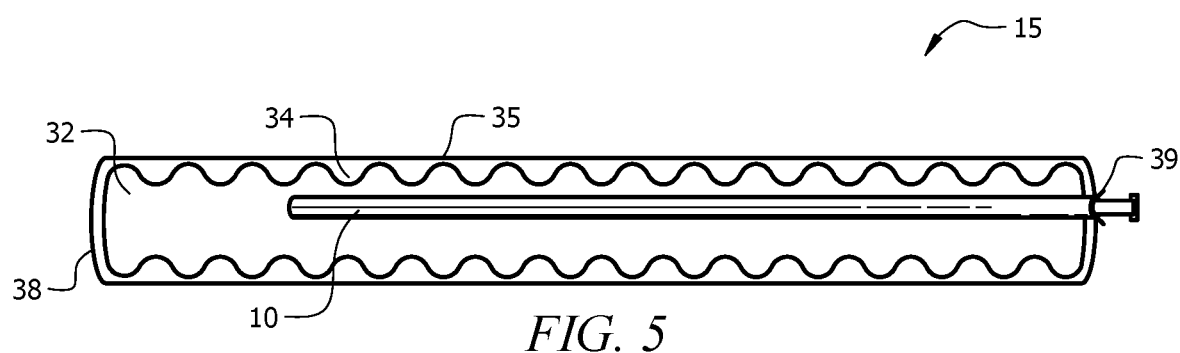
FIG. 5 is a transverse cross section injection system, showing the corrugated sampling mesh, and sample well.

Sieve 38 was the outermost portion of sampling mesh 15 and encases corrugated conduit 30. The sieve is a geotextile sock, formed of polyester or stainless steel. The ends of sieve 38 were fixed to sample well tubing on a first end by sieve fastener 39. Sieve fastener 39 may be any fastener known in the art for fixing to tubular structures. Examples of fasteners include tie wraps for the sieve at the lower-most section and steel, plastic, or metal bands or tie wraps around the sieve and tubing at the upper-most section. Sieve 38 was fixed to the corrugated conduit on one end, and an end cap or a fused material on a second end. For example, the sieve material, such as the geotextile sock, is optionally fused on the second end. Where the sieve material is fused on the second end, the sieve has a general appearance of a "tube sock". The sieve is connected to the sample well The sampling end of the sample well tubing was disposed in interior 32 of corrugated conduit 30. The rib of corrugated conduit 30 provides a pocket between corrugated conduit 30 and sieve 38, allowing the fluid to flow around the body exterior of corrugated conduit, while the soil was supported by sieve 38, as seen in FIG. 5.

Example 4

In matrices having strong lithography, i.e. the matrix will not immediately collapse a bore hole, the sampling system was installed without back reaming. In this embodiment, the matrix analysis indicates that the bore hole can withstand the lateral pressure long enough to enable removal of installation sleeve 2.

Sampling system 1 was prepared by attaching sampling mesh 15 to sampling well 10, as provided in Example 2. This process was repeated with tubing of various sizes, such as each tube differing by 10 feet. The plurality of tubes for the sample wells were aligned and tacked to the anchor sampling well at sample well tacking 16, forming a sampling well bundle, as provided in Example 2.

At least one grout line 20 was assembled into the sampling well bundle, running opposite the sampling wells, thereby limiting the space required for the sample well bundle, as provided in Example 2. First grout line 20A was oriented such that a first end terminates along the tubing for the anchor sampling well 12. Where a third sample well is included in the sample well bundle, a second grout line is assembled into the sampling well bundle, which were oriented as described in the previous examples. After the grout lines were oriented into the sample well bundle, the grout lines were tacked to the anchor sample well at grout line tacking 17. Grout line tacking 17 is disposed along the tubing of anchor well 12 adjacent to sample mesh 12A, as seen in FIG. 2.

The sample well bundle was loaded into installation sleeve 2, and the sample well bundle anchored to a first end of installation sleeve 2, as provided in previous examples. A drill pull swivel was mounted to a second end of installation sleeve 2. The sample well bundle was optionally spooled and placed on the back of a trailer.

The drill pull swivel was attached to a horizontal direction drill (HDD) bit. The HDD drill bit was placed at exit point C, and advanced through the borehole using a mud to lubricate installation sleeve 2, as provided for the initial HDD drilling in Example 2. During the drilling, installation sleeve 2, containing the sample well bundle, was moved into the borehole, i.e. the bore hole was not back reamed. At the surface, the HDD drill was disconnected from installation sleeve 2. The sleeve was filled with mud break fluid. The sample well bundle was anchored and installation sleeve 2 attached to a reel and spool trailer or other removal device. Installation sleeve 2 was removed from the borehole. The matrix surrounding the sample well bundle was allowed to settle. The well system (well segments) was developed by using suction pumps or a vacuum truck to remove drill mud and allow the formation to equalize around the well materials. Each tube for the sample well was attached to a manifold or pump and mud and water removed from the matrix surrounding the wells. Well development usually requires at least 3 hours, which varies with matrix lithology.

Grout or sealant was inserted into grout line 20 and injected into the matrix, as provided in Example 2. As an example, a grout or sealant source was fixed of a second end of first grout line 20A, located on entry point A and the grout or sealant pressurized to force the grout or sealant out of the first end of first grout line 20A, isolating sampling mesh 15A from sampling mesh 15B. The process was repeated for any additional grout lines. Optionally, after grouting or sealing the system, the grout lines and cut and bentonite seal 37 was placed on the bore hole head side and bore hole exit side of the hole.

Example 5

A contamination site in south Florida, currently in use and containing buildings required contamination detection and analysis. A common issue for contamination detection and analysis is the existence of a building or structure impeding access to contaminated soil. In many instances, the building or structure lies above the source of contamination, where soil sampling is most advantageous. Data gaps typically cause significant problems in contamination sampling, leading to prolonged remediation and higher costs. Even though assessment is well recognized, and high-resolution site characterization (HRSC) has made great advances in more complete more accurate assessments, this problem has not been addressed by known sampling, detection, and analysis methodology.

Figure 6:
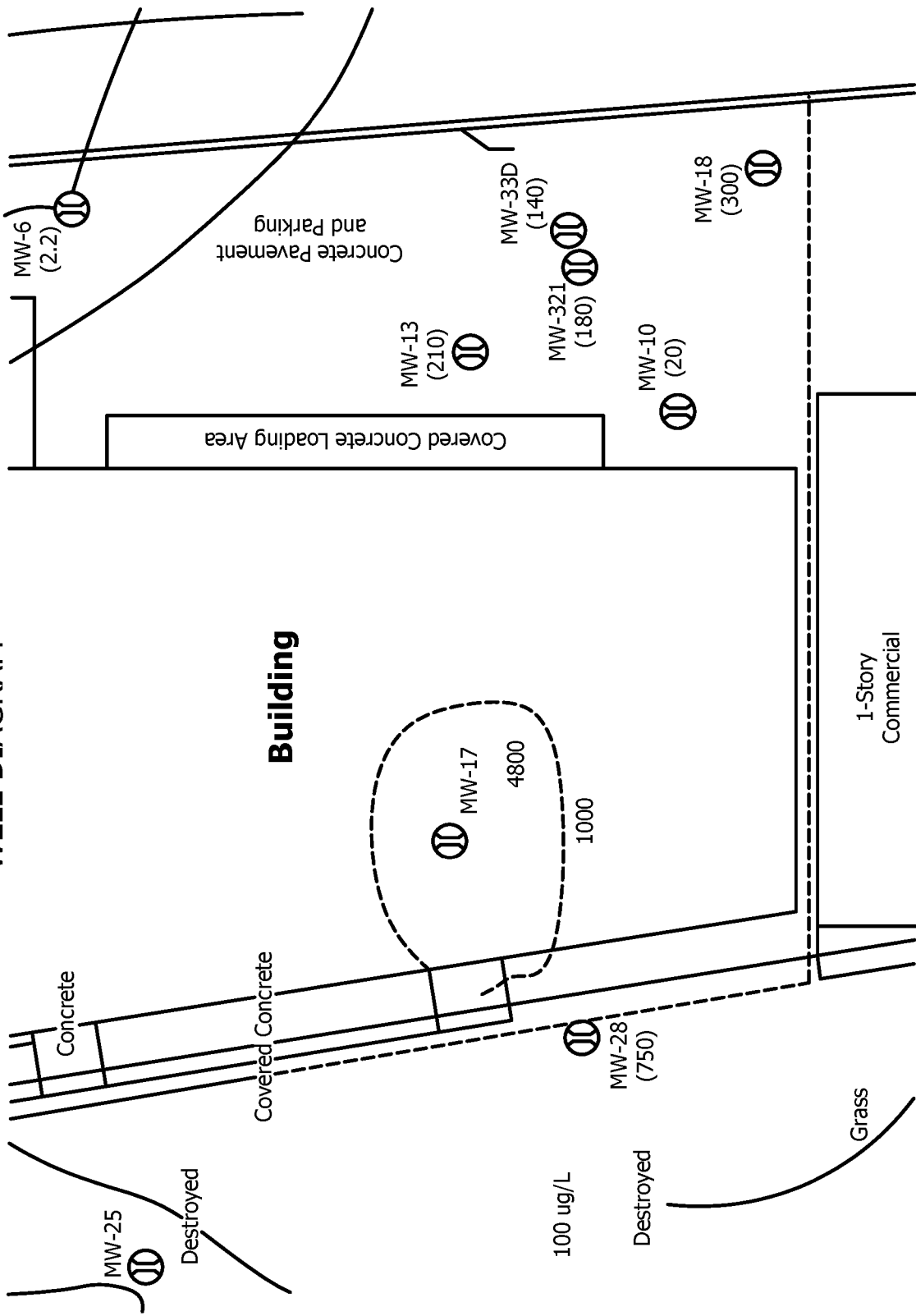
FIG. 6 is an illustration of the initial assessment of a test site, prior to installation of the injection system.

The south Florida site contained an active i.e. in-use, 80-foot-wide building with an assortment of equipment and small hallways, as seen in FIG. 6. Silty sand and sandy clays typical of Florida reside in the top 15 ft. The lithology transitions to a clay confining layer at 15 to 17 ft below land surface (bls). Sampling systems would lead to a very costly and disruptive interior assessment, preventing use of HRSC or other traditional sampling systems. Initial assessment of the contamination suggested a high contamination concentration at the southwest portion of the building, of around 4800 ppb. The present invention was installed at the site, including one vertical bore well installed inside the building (MW-17) and four horizontal bore wells outside the building, seen in FIG. 7.

Figure 7:
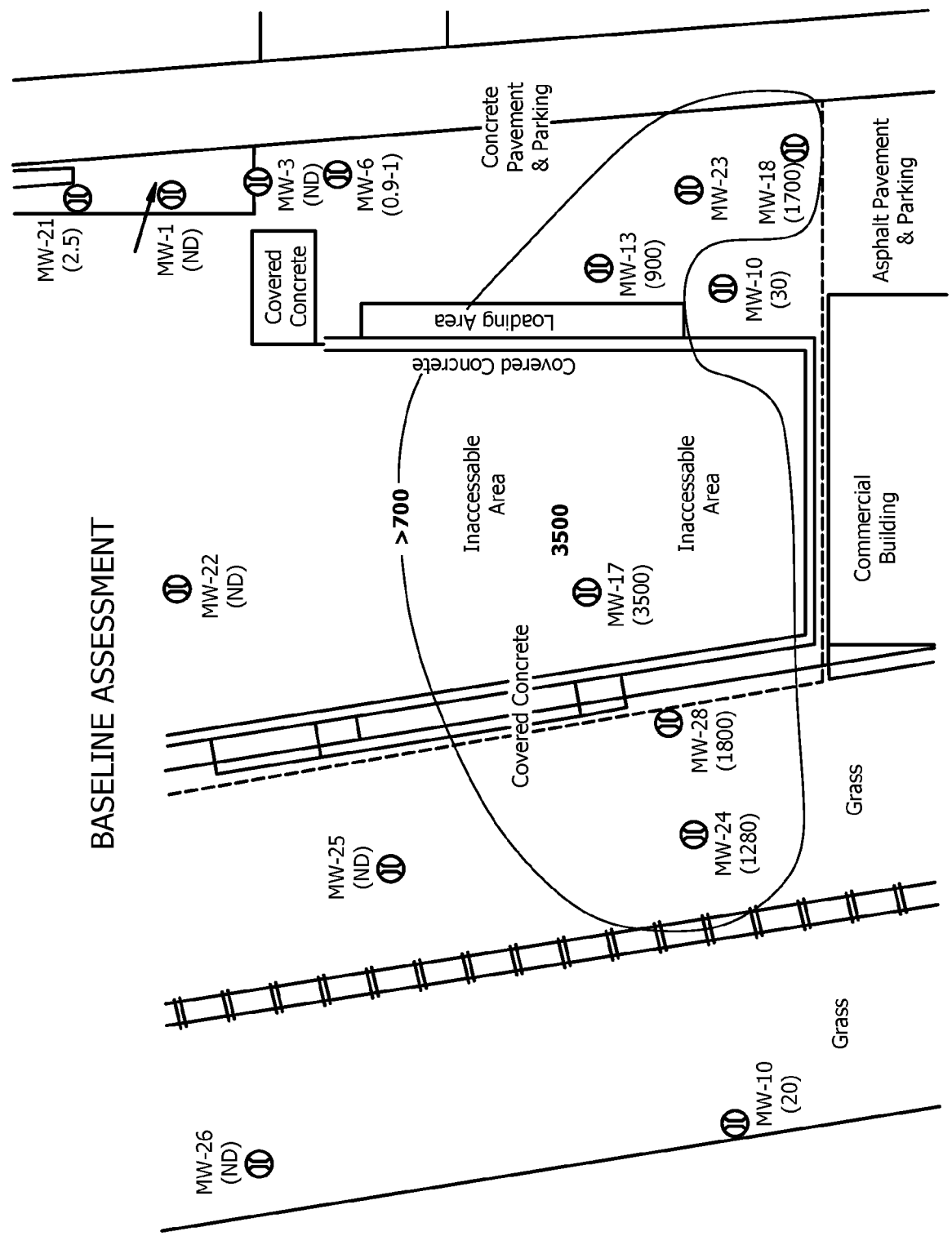
FIG. 7 is an illustration of the baseline assessment of the test site shown in FIG. 6, showing initial assessment from the injection system.
Figure 8:
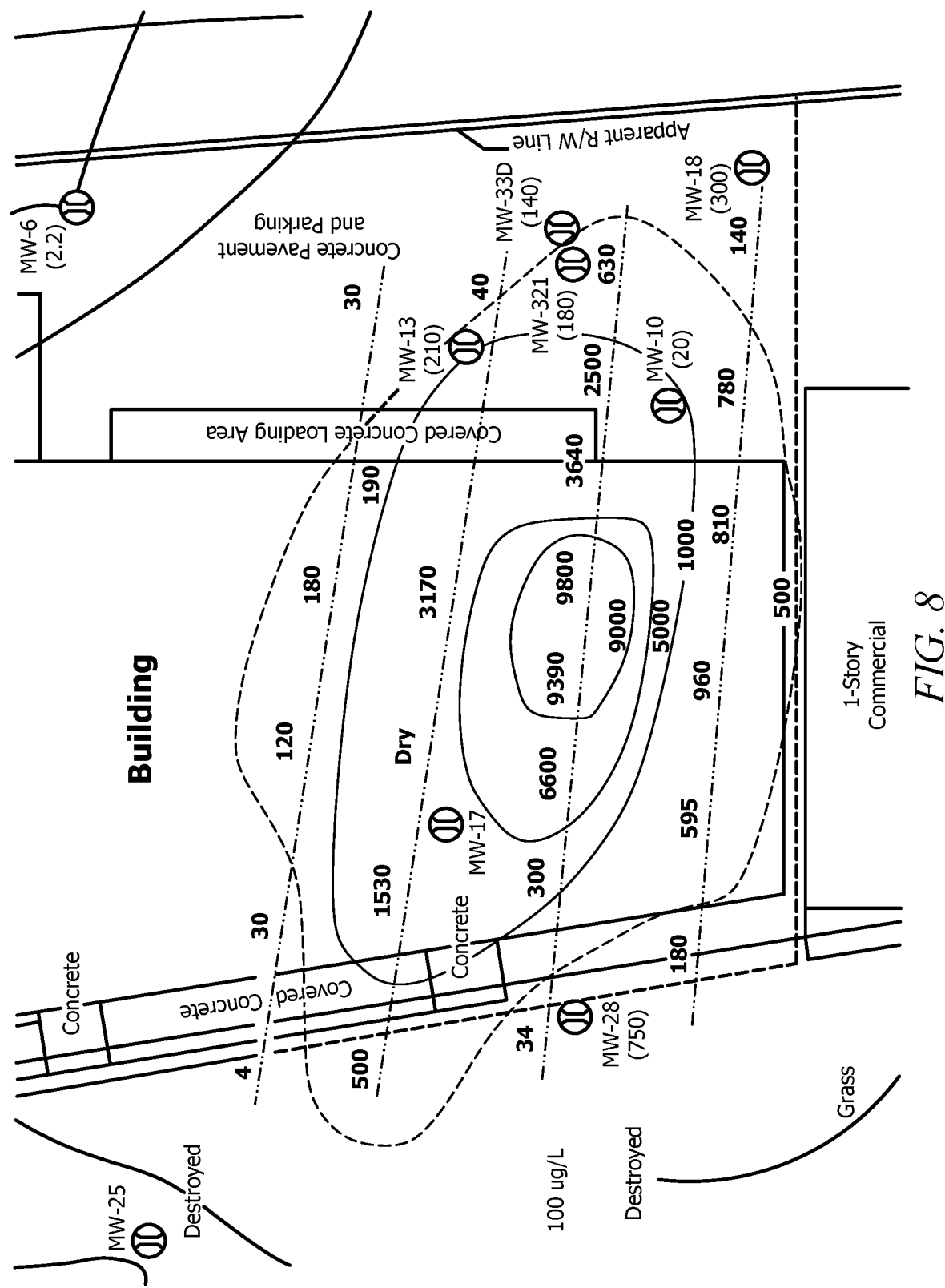
FIG. 8 is an illustration of the final assessment of the test site shown in FIG. 6, showing the final assessment from the injection system.

Horizontal bore holes were formed using horizontal directional drilling (HDD), and a plurality of sample wells 10 were installed into a bore hole. This allowed for the bore hole to be drilled from outside the structure, but precisely located under the building, which was required to obtain accurate data on the site contamination. Concurrently, the use of multiple sampling wells in a single bore hole permits minimal impact on the environmental matrix, while also permitting testing at multiple locations under the structure to accurately and precisely determine sources of contamination.

Where multiple sampling locations are required that are spread throughout the site, such as seen in FIG. 7, more than one bore hole can be used. The horizontal spacing can be adjusted as required for the site, which would be within the skill of one in the art. For example, wells can be installed 10 ft on center to allow increased precision similar to HRSC data collection, at 25 ft on center, or farther, as required. The wells were installed directly on top of the clay confining layer at the site and are designated by the dot-hyphen lines (— • • —) shown in FIG. 8. It was known that the solvents sank down to this layer and the most concentrated sample results would be collected from this depth (approximately 15 ft bls). Five monitoring wells, screened from 5-15, characterize the plume, MW-17, MW-28, MW-13, MW32I, and MW-18, as seen in FIG. 8. These wells were developed and sampled after the development water cleared and in situ parameters stabilized. Initial assessment using the injection devices showed a concentration at the southwest corner at 3500 ppb. The multi-channel well installation of the invention allowed the sampling to provide a clearer location for the contaminant source and a more accurate representation of the plume. This permitted for formation of a directed, specific remediation plan to move forward. The provided data has the clarity and spacing similar to HRSC tools. Unlike most HRSC tools, these wells can be resampled again and again. This allows for re-monitoring of the site conditions, instead of having to recomplete a HRSC event.

Sampling indicated that the most impacted well, MW-1700, had a concentration of HVOCs of 4,800 ppb, as seen in FIG. 8. Analysis of the collected data showed the highest levels of HVOCs were focused in a zone under the building, presumably indicating a source of the contaminant, and also provided a reliable estimate of contaminant mass present. Further, the data showed a clear indication of the iso-contours of the contaminant plume.

Advantageously, the bore holes provide numerous utilities to the site operator. The sampling performed after installation provided a detailed description of the contaminant, as described above, and allowed for a directed, specific remediation plan. For example, after review of the data, it was decided to place screens for future treatment, and the locations for the screens determined. Chemical oxidant treatment (ChemOx) was elected for remediation due to the rapidity of contaminant removal. The screens allow for ChemOx treatment at a precise depth, as well as to target specific locales for treatment. However, where quick remediation is not required, treatment can be via bioremediation or extraction of the groundwater. The sampling wells can be used for injection of chemical, biological, or other remediator, i.e. injection, using the same device, thus the device is multipurpose. Advantageously, this decreases installation time, costs, and impact on the substrate, such as soil, since the device need be installed only once.

In instances such as this site, not all the wells have to be used for treatment; some can be reserved for sampling only. The installation occurs congruent to the lithology and plume shape. It allows better treatment and less overall drilling. Only one vault is needed per well group minimizing unsightly well pads. Further, installation and use of the inventive device significantly reduced costs.

Example 6

Figure 9:
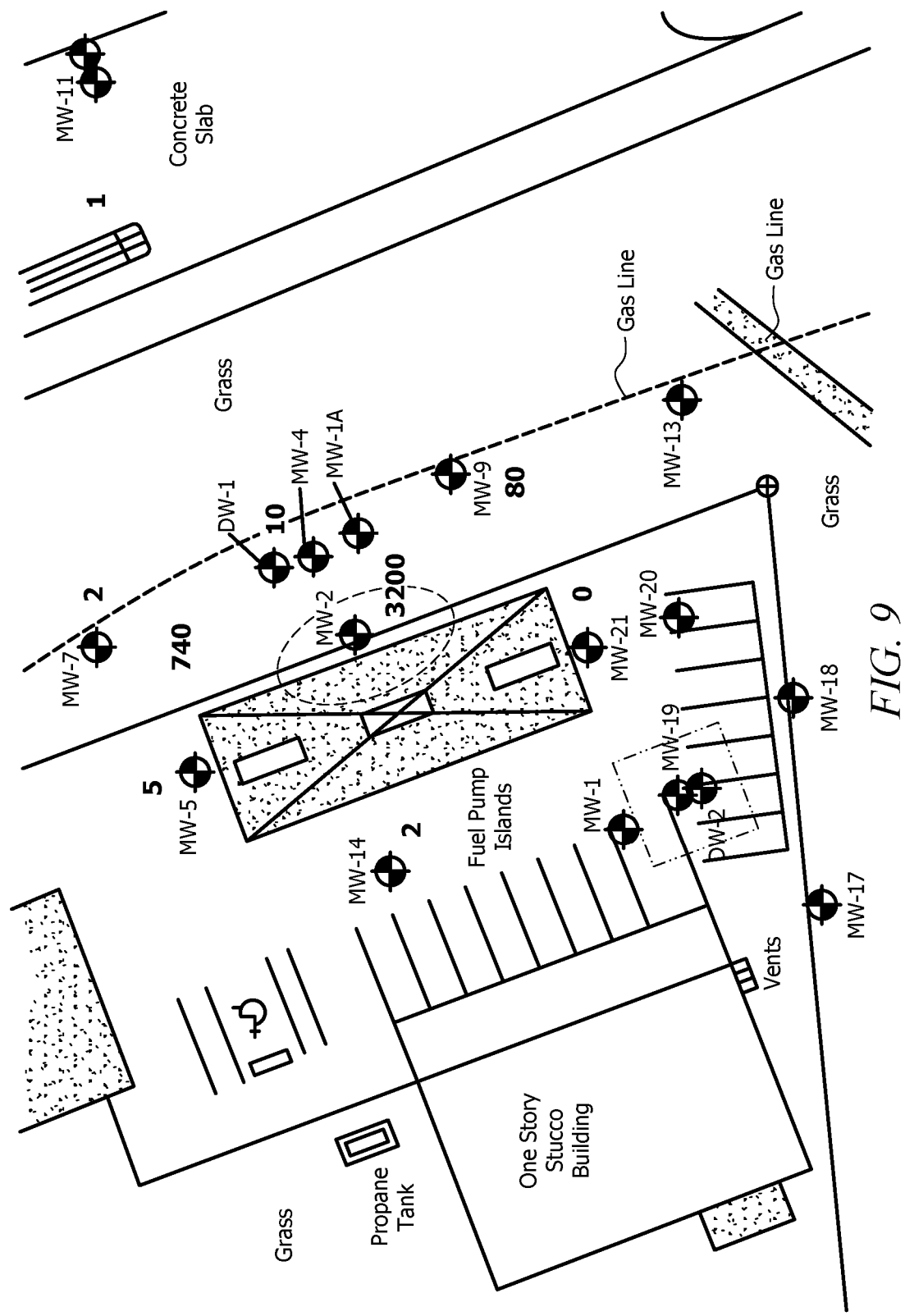
FIG. 9 is an illustration of a prior assessment on a test site shown, showing Volatile Organic Aromatic (VOA) compounds, which is determined as the sum of benzene, toluene, ethylbenzene, and xylenes.

A convenience store and fuel station were tested for contamination using traditional sampling wells, as seen in FIG. 9. Sampling showed Volatile Organics Aromatics (VOAs) reached a maximum of 3200 parts per billion (micrograms per liter) immediately adjacent to the pumping island in the groundwater samples. A second sampling well identified groundwater containing 80 ppb of VOAs. All other sampling wells reported negligible amounts of VOAs.

The operator of the test site requested subsequent testing of the site. The inventive system was installed for additional assessment and treatment. The sampling wells were installed as described in Examples 2-4. Horizontal directional drilling (HDD) equipment was installed on unoccupied land adjacent to the test site, which remained in use during installation for both the store and fuel station. Two boreholes were drilled, seen in FIG. 10 as dot-hyphen lines (— • • —), and six sampling wells installed as described in Example 1. The use of the six wells permitted development of iso-contours and facilitated pin-pointing the contamination impact more precisely. The well systems were installed in one day, under the canopy in previously difficult, poorly accessible, locations.

Figure 10:
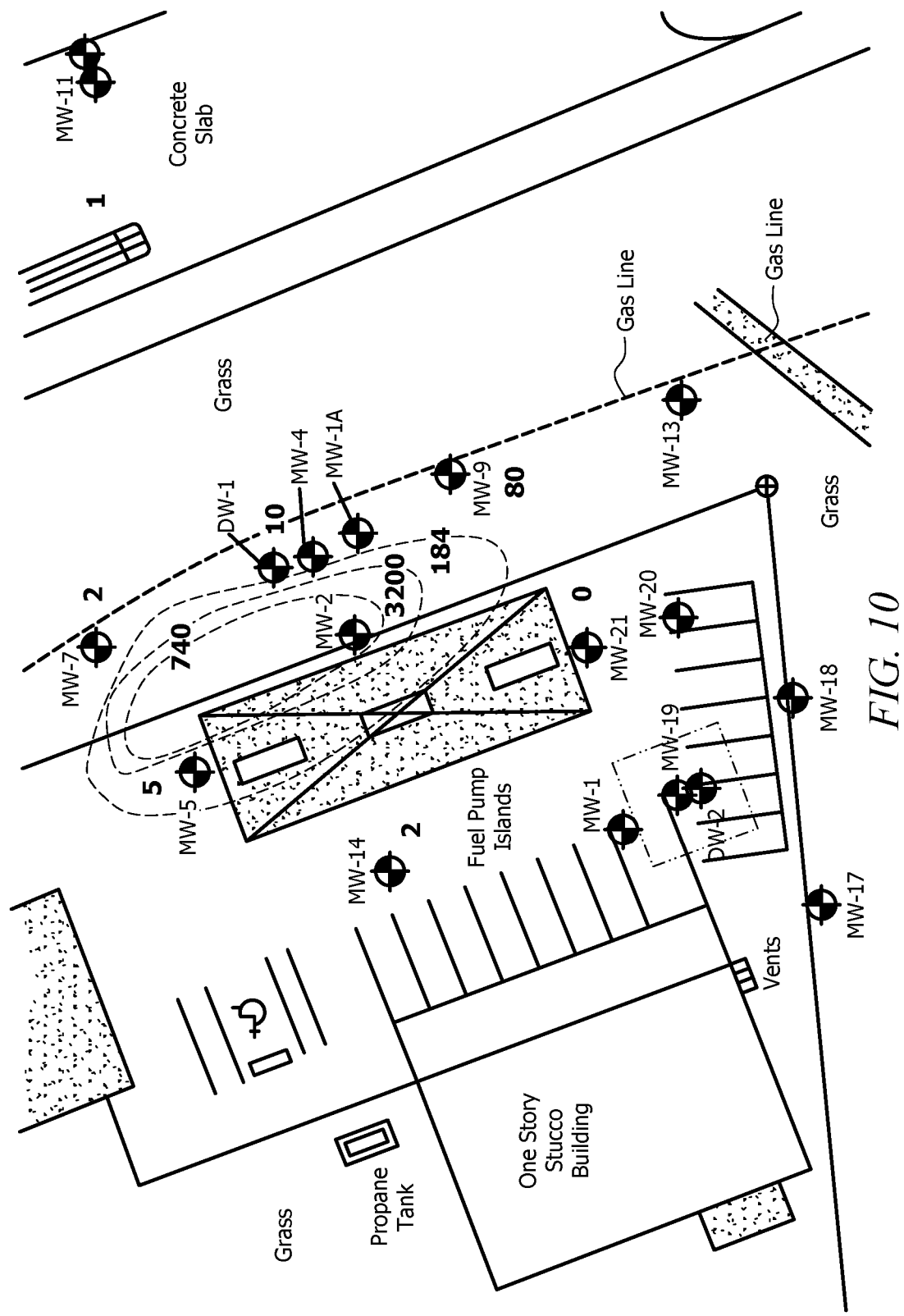
FIG. 10 is an illustration of the final assessment of the test site, showing the final assessment from the injection system.

The inventive system sampling showed three locations on the site having VOAs at above 1000 ppb levels, as seen in FIG. 10. Maximum levels were found to be 7740 ppb along the east side of the fuel station. An area around the highest-contaminated area possessed VOAs of 3200 ppb. The sampling wells also identified an area under the fueling station with VOA levels of 1150 ppb. Two additional sites identified VOA levels above 100 ppb, one on the northern portion of the fuel station with VOA levels of 308 ppb and a second location to the east of the fueling station with VOAs of 184 ppb. The most impacted area is identified to the east of MW-5 and under the canopy. Concentrations are twice as contaminated as previously identified. The data from the sampling wells is being used to develop of plan to surgically target the impact with remedial compositions. The remedial compositions will be injected into the site using the sampling wells.

In the preceding specification, all documents, acts, or information disclosed do not constitute an admission that the document, act, or information of any combination thereof was publicly available, known to the public, part of the general knowledge in the art, or was known to be relevant to solve any problem at the time of priority.

The disclosures of all publications cited above are expressly incorporated herein by reference, each in its entirety, to the same extent as if each were incorporated by reference individually.

While there has been described and illustrated specific embodiments of a cancer detection system and method for of detecting cancer using the same, it will be apparent to those skilled in the art that variations and modifications are possible without deviating from the broad spirit and principle of the present invention. It is also to be understood that the following claims are intended to cover all the generic and specific features of the invention herein described, and all statements of the scope of the invention which, as a matter of language, might be said to fall therebetween.

What is claimed is:

1. A multi-well environmental remediation or sampling system, comprising:
   a plurality of sample wells oriented in a first direction and insertable into an insertion aperture of a horizontal bore hole, each of the plurality of sample wells including a well body having a first end and a second end, wherein the second end is configured to fluidly connect to a pump;
   each of the plurality of sample wells terminating at different horizontal distances relative to the insertion aperture, such that each of the plurality of wells can remove discrete sampling material from different areas within the horizontal bore hole; and
   a tacking, wherein the tacking fixes two or more of sample wells to one another.

2. The multi-well environmental remediation or sampling system of claim 1, further including at least one grout line oriented in a second direction that is opposite of the first direction and including a grout line body having a first end and a second end, wherein the second end is dimensioned to seat on a pump and the grout line body is hollow to permit the passage of grout.

3. The multi-well environmental remediation or sampling system of claim 1, further comprising an installation sleeve, wherein the installation sleeve comprises:
   a hollow sleeve body having a first end and a second end adapted to mate to a drill; and
   an interior lumen dimensioned to accept the plurality of sample wells and at least one grout line.

4. The multi-well environmental remediation or sampling system of claim 1, further comprising a sampling mesh disposed on a first end of each of the well bodies, the sampling mesh including:
   a sieve having a first end and a second end and an interior lumen, wherein the sieve is made of flexible or semi-flexible material;
   a corrugated conduit disposed in the interior lumen of the sieve,
      wherein the corrugated conduit has a plurality of peaks formed of a plurality of external ribs and a plurality of troughs formed of a plurality of internal ribs;
      wherein the plurality of peaks and troughs are disposed perpendicular to a longitudinal axis of the corrugated conduit, and the corrugated conduit has an interior lumen;
   at least one sampling channel formed on the outer surface of the corrugated conduit and running parallel to the longitudinal axis of the corrugated conduit, wherein the at least one sampling channel is formed from removal of the plurality of external ribs of the corrugated conduit;
   an opening on a first side of the corrugated conduit, wherein the opening permits the first end of at least one the plurality of sample wells to access the interior lumen of the corrugated conduit; and
   wherein the first end of the sieve is tacked to the well body of the sample well.

5. The multi-well environmental remediation or sampling system of claim 4, wherein the sieve is a geotextile sock, wire mesh, or stainless-steel screen.

6. The multi-well environmental remediation or sampling system of claim 1, further comprising a sampling system or sampling pump in fluid communication with the second end of the well body, where the sampling system or sampling pump is a negative displacement pump, a diaphragm pumps, peristaltic pump, a screw pump, a metering pump, a piston, a pump, a centrifugal pump, a jet pump, or an electric diaphragm pump.

7. The multi-well environmental remediation or sampling system of claim 1, wherein the tacking is a strap or tie wrap.

8. A method of remediating or sampling for an environmental contaminant in a matrix, comprising:
drilling a horizontal bore hole in an environmental matrix;
providing a plurality of sample wells to form a sample well bundle, each of the plurality of the sample wells including a hollow well body having a first end and a second end, wherein the second end is configured to fluidly connect to a pump and the sample well bundle is insertable into an insertion aperture of the horizontal bore hole;
each of the plurality of sample wells terminating at different horizonal distances relative to the insertion aperture, such that each of the plurality of sample wells can remove discrete sampling material from different areas within the horizontal bore hole;
providing an installation sleeve dimensioned to accept the plurality of sample wells;
inserting the sample well bundle into the sleeve;
inserting the installation sleeve and sample well bundle into the horizontal bore hole; and
removing the installation sleeve from the horizontal bore hole and concomitantly retaining the sample well bundle in the horizontal bore hole.

9. The method of claim 8, further comprising:
providing at least one grout line oriented in a second direction that is opposite of the first direction and includes a grout line body having a first end and a second end dimensioned to seat on a grout pump; and
tacking the first end of the at least one grout line to the sample well possessing the largest longitudinal dimension adjacent to the sampling mesh to form the sample well bundle.

10. The method of claim 9, further comprising:
removing water from the matrix;
injecting grout or expanding sealant through the at least one grout line into the matrix; and
testing for the environmental contaminant.

11. The method of claim 10, wherein the testing for the environmental contaminant further comprises:
subjecting the plurality of sampling wells to a first negative pressure;
collecting effluent from each of the plurality of sampling wells; and
analyzing the effluent to identify one or more environmental contaminants.

12. The method of claim 11, further comprising remediating the environmental contaminant in the matrix, comprising:
injecting at least one remediator, extracting the environmental contaminant, or a combination thereof;
wherein the injection of the at least one remediator further comprises:
providing a liquid carrier;
adding a remediator into the liquid carrier to form a remediation fluid;
injecting the remediation fluid into at least one of the plurality of sample wells, wherein the at least one of the plurality of sample wells indicated presence of the environmental contaminant;
contacting the environmental contaminant with the remediation fluid; and permitting the remediator in the remediation fluid to degrade or dispose of the environmental contaminant;
wherein the extracting the environmental contaminant further comprises:
subjecting the each of the sample wells to a second negative pressure, wherein the second negative pressure is greater than the first.

13. The method of claim 12, further comprising injecting the carrier and remediator into the soil.

14. The method of claim 12, wherein the extracting the environmental contaminant further comprises:
applying an environmentally friendly solvent to the matrix, wherein the environmentally friendly solvent dissolves the environmental contaminant; and
extracting the environmentally friendly solvent using the second negative pressure.

15. The method of claim 8, further comprising a sampling mesh disposed on a first end of each of the well bodies.

16. The method of claim 8, further comprising fixing the installation sleeve to a drill.

17. The method of claim 8, wherein the drilling step further comprises:
providing a horizontal direction drill;
advancing the horizontal direction drill into the matrix at a preselected angle to a preselected depth;
leveling the drilling to a horizontal position in relation to the matrix surface;
advancing the horizontal direction drill into the matrix at the horizontal position for a preselected length;
angling the horizontal direction drill to the preselected angle;
advancing the horizontal direction drill into the matrix until the horizontal direction drill reaches the matrix surface; and
fixing the installation sleeve to the drill.

18. The method of claim 8, wherein the sampling mesh comprises:
a sieve having a first end and a second end and an interior lumen, wherein the sieve is made of flexible or semi-flexible material;
a corrugated conduit disposed in the interior lumen of the sieve,
wherein the corrugated conduit has a plurality of peaks formed of a plurality of external ribs and troughs formed of a plurality of internal ribs;
wherein the plurality of peaks and troughs are disposed perpendicular to a longitudinal axis of the corrugated conduit, and wherein the corrugated conduit has an interior lumen;
at least one sampling channel formed on the outer surface of the corrugated conduit and running parallel to the longitudinal axis of the corrugated conduit, wherein the at least one sampling channel is formed from removal of the plurality of external ribs of the corrugated conduit;
an opening on a first side of the corrugated conduit, wherein the opening permits the first end of each of the sample wells to access the interior lumen of the corrugated conduit; and
wherein the first end of the sieve is tacked to the well body.

19. The method of claim 18, wherein the sieve is a geotextile sock, wire mesh, or stainless-steel screen.

20. A multi-well environmental remediation or sampling system, comprising:
a plurality of sample wells oriented in a first direction and insertable into an insertion aperture of a horizontal bore hole, each of the plurality of sample wells including a well body having a first end and a second end, wherein the second end is configured to fluidly connect to a pump;
a multitude of the plurality of sample wells terminating at different horizontal distances relative to the insertion aperture, such that the multitude of the plurality of sample wells can remove discrete sampling material from different areas within the horizontal bore hole;

at least one grout line including a grout line body having a first end and a second end, wherein the second end is dimensioned to seat on a pump and the grout line body is hollow to permit the passage of grout; and a tacking, wherein the tacking fixes two or more of sample wells to one another.

* * * * *